(12) United States Patent
Regelman et al.

(10) Patent No.: US 9,548,825 B1
(45) Date of Patent: Jan. 17, 2017

(54) AUDIO EVENT TRIGGERS FOR BROADCAST

(71) Applicant: Jelli, Inc., San Mateo, CA (US)

(72) Inventors: Yuri Regelman, Milbrae, CA (US); Adam Kay, San Jose, CA (US); Jateen P. Parekh, San Mateo, CA (US)

(73) Assignee: Jelli, Inc., San Mateo, CA (US)

( * ) Notice: Subject to any disclaimer, the term of this patent is extended or adjusted under 35 U.S.C. 154(b) by 0 days.

(21) Appl. No.: 14/576,067

(22) Filed: Dec. 18, 2014

Related U.S. Application Data

(60) Provisional application No. 61/918,617, filed on Dec. 19, 2013.

(51) Int. Cl.
| | |
|---|---|
| *H04H 20/28* | (2008.01) |
| *H04H 20/10* | (2008.01) |
| *H04H 60/37* | (2008.01) |
| *H04N 19/00* | (2014.01) |

(52) U.S. Cl.
CPC ........... *H04H 20/103* (2013.01); *H04H 20/28* (2013.01); *H04H 60/375* (2013.01); *H04N 19/00* (2013.01)

(58) Field of Classification Search
CPC .................................. H04N 19/00; H04H 20/28
USPC ....... 455/3.01, 3.02, 3.03, 414.1, 452.1, 509
See application file for complete search history.

(56) References Cited

U.S. PATENT DOCUMENTS

| | | | | |
|---|---|---|---|---|
| 7,813,822 | B1* | 10/2010 | Hoffberg | G06K 9/00369 381/73.1 |
| 2005/0152256 | A1* | 7/2005 | Kikuchi | G11B 27/034 369/59.25 |
| 2009/0044230 | A1* | 2/2009 | Oh | H04N 21/235 725/62 |

OTHER PUBLICATIONS

Author Unknown, Broadcast Tools, Inc., Problem Solved, Installation and Operation Manual, DTD-16 Plus, 16 Channel DTMF Tone/Sequence Decoder Installation Manual, Jun. 24, 2013.

\* cited by examiner

*Primary Examiner* — John J Lee
(74) *Attorney, Agent, or Firm* — Van Pelt, Yi & James LLP

(57) ABSTRACT

Information associated with a broadcast stream event is encoded within an in-band broadcast. The encoded information in a broadcast stream is detected. The detected information is decoded at least in part to determine content to be injected into the broadcast stream.

24 Claims, 8 Drawing Sheets

AUDIO EVENT TRIGGERS FOR BROADCAST

CROSS REFERENCE TO OTHER APPLICATIONS

This application claims priority to U.S. Provisional Patent Application No. 61/918,617, entitled AUDIO TRIGGERS filed Dec. 19, 2013 which is incorporated herein by reference for all purposes.

BACKGROUND OF THE INVENTION

Broadcast systems typically comprise at least three types of system. Traffic systems schedule advertising, programming systems schedules programming, and an automation system broadcasts or plays the combination from traffic and programming systems based on a broadcast, or format, clock. The clock provides a template for programming which includes top of the hour station IDs, commercial breaks, news breaks, talk breaks, and other programming. An automation system operates from merged logs (called "live logs" or "final logs") of the traffic and programming systems to create main program audio for broadcast. In many cases, the automation system is the main play out system. The automation system audio path may lead to mixers, switches, consoles, and eventually to a broadcast audio processing chain, which may also include a studio-to-transmitter link (STL).

A play out system is a system that can play content for broadcast. If a secondary play out system is used such that for example to insert real time program content, the primary play out system must signal, or trigger, the secondary system to begin playing program content, for example ads. There exists a need for a robust method for signaling these events.

BRIEF DESCRIPTION OF THE DRAWINGS

Various embodiments of the invention are disclosed in the following detailed description and the accompanying drawings.

DETAILED DESCRIPTION

Figure 1:
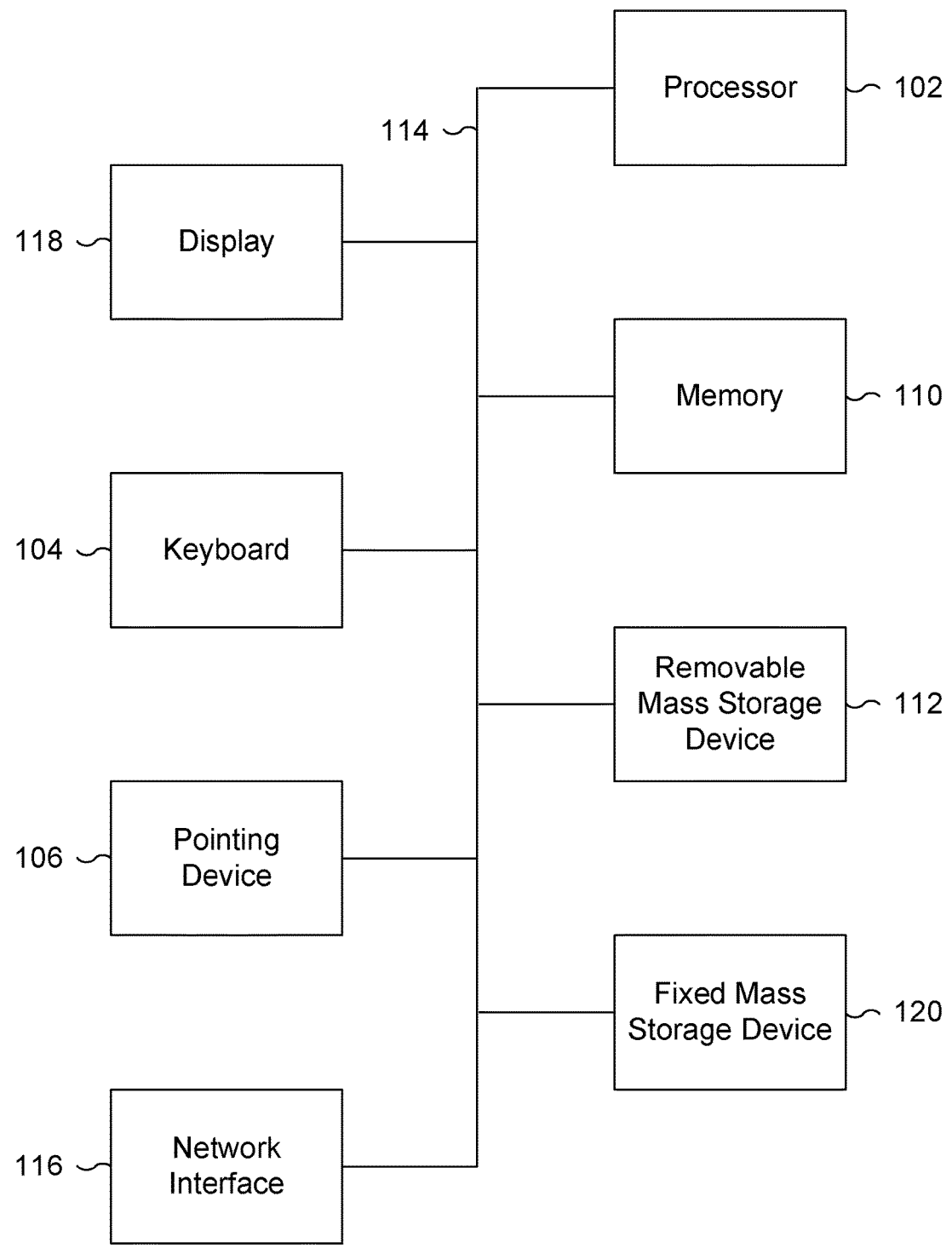
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robust standard for triggering events that can interoperate with different broadcast stations, equipment, and system is disclosed. The standard is designed to work with all industry automation, or programming play out, systems. The standard interoperates by using in-band signals included in main program audio rather than out-of-band signals such as, for example, physical (relay) closures, serial/parallel port signaling, and/or computer network or TCP/IP ("transmission control protocol over internet protocol") signaling between the server boxes. Throughout this specification "in-band" in the context of a broadcast station refers to signals that are carried within main program audio or a stream to be broadcast ("broadcast stream") itself. Without loss of generality, this specification refers to examples in radio/audio broadcast, but any person having ordinary skill in the art recognizes that the concepts may be extended to television broadcast, video broadcast, movie broadcast, sports broadcast, satellite broadcast, and cable broadcast.

In-band signaling within program audio presents a lowest common denominator for play out systems as every broadcast play out system can by definition output to the broadcast stream. Program audio, whether analog or digital, has the highest quality of service due to the nature of broadcast, and is one of the industry adopted technologies is defined by industry wide standards. Traditionally, in-band signals for triggering have existed but are unpopular. Traditional in-band triggers use audio single-tone or dual-tone signaling, for example using the DTMF ("dual tone multi frequency") standard used in push-button telephones.

The disadvantages of physical closures include limitations to support and scale increasing number of unique closures or systems, the requirement for additional equipment and equipment configuration for each node of the trigger network, and reliability of supporting a secondary network between each server/system.

The disadvantages of electronic or computer networks using, for example, serial ports or TCP/IP include the requirement for additional features or equipment, and a lack of a standard across all automation systems, so case-by-case or deep integration is required for each broadcast station.

Audio tones have the ability to work across all automation systems without requiring additional equipment or configuration but traditional audio tones have disadvantages including the requirement to play the tones at a level and/or frequency that is human perceptible by consumers, requiring the tone to play during a silent or blank passage, leaving potential "gap" content, and requiring a human perceptible amount of time, for example one second, to detect the tone. Throughout this specification "gap" content refers to broadcasting the absence of content, for example for audio broadcasts a silent passage and for video broadcasts a black or static image.

By contrast, a method to encode data in-band is disclosed. Leveraging in-band broadcast for communication ensures high reliability and quality. Data is encoded using modulation techniques and two examples are given: a) pitch shifted DTMF to ensure fast response times, and b) GMSK ("Gaussian minimum shift keying") shifted to standard broadcast frequencies.

The traditional audio triggers used in broadcast were simple start tones or telephone DTMF tones with frequencies between 697 Hz and 1.633 kHz, often at audible levels/amplitude, which as stated above has the disadvantages of human perceptible tones, trigger latency, a risk of false triggers or missed triggers, and/or slow response times. Pitch shifted DTMF uses base DTMF tones that have been frequency upshifted. In one embodiment the tones are upshifted by a factor of approximately five to support reading data with faster response times. The pitch shifted DTMF frequencies with frequencies between 3.8 kHz and 9.0 kHz work in applications supporting wider frequency ranges above traditional telephone standards, for example the bandwidth for broadcast voice and/or for broadcast music.

In some embodiments, the pitch shifted DTMF system may adjust level of the tones to be far below the normal broadcast programming level, and above a typical broadcast noise floor of between −70 dBM to −90 dbM below average peak programming levels. In one embodiment the pitch shifted DTMF system plays tones a level of −64 dBm down from average peak programming levels.

Thus, the benefits of pitch shifted DTMF include having data encoded in-band to reduce or eliminate false triggers, a faster response time with a higher base frequency (up to 9 kHz) over traditional DTMF in-band triggers, and a reduced level far below programming peak levels to be less human perceptible to a broadcast consumer.

In another embodiment, GMSK traditionally used for high frequency wireless, for example cellular mobile phone equipment, is applied to lower frequency wired applications for broadcast stations as a trigger modulation. Throughout this specification "modulation" refers without loss of generality to conveying of a message, inside another signal that can be physically transmitted, and can refer to analog modulation, digital modulation, baseband modulation, pulse modulation, spread spectrum modulation, and any other modulation techniques.

Although GMSK is detailed in the instant specification, any person having ordinary skill in the art appreciates the technique is generalizable to using other modulation, for example ASK ("amplitude shift keying"), APSK ("amplitude and phase shift keying", CPM ("continuous phase modulation"), FSK ("frequency shift keying"), MFSK ("multiple frequency shift keying"), MSK ("minimum shift keying"), OOK ("on off keying"), PPM ("pulse position modulation"), PSK ("phase shift keying"), QAM ("quadrature amplitude modulation"), I/Q modulation, SC-FDE ("single-carrier FDMA"), and TCM ("trellis coded modulation"), CSS ("chirp spread spectrum"), DSSS ("direct sequence spread spectrum"), FHSS ("frequency hopping spread spectrum"), THSS ("time hopping spread spectrum"), AM ("amplitude modulation"), FM ("frequency modulation"), PM ("phase modulation"), SM ("space modulation"), and SSB ("single sideband modulation").

In one embodiment a well-understood GMSK implementation is used, such as that used by GSM (the "global system for mobile communications") phone network, but downshifted to between 15 kHz and 22 kHz to be implementable in-band within a studio program audio stream. Frequencies between 15 kHz and 22 kHz are less human perceptible than those between 0 and 15 kHz. GMSK can also leverage error detection and correction ("EDC") techniques and its orthogonal distance from normal broadcast content (including talk shows, other ads, or musical programming) so that it can be machine detectable across a wide range of levels, including within the noise floor of −70 dBm, or below.

Thus, the benefits of downshifted GMSK include having data encoded in-band to reduce or eliminate false triggers, further reducing any gaps in programming in that the trigger may be covered by other content leading to a faster response time over traditional DTMF in-band triggers, and reduced human perception to a broadcast consumer. Unlike the pitch shifted DTMF system described above, GMSK can be automatically detected when "covered" or played simultaneously with other content, which can lead to a "tighter" broadcast sound, meaning less silence or dead air. The higher frequencies permit GMSK to support more data payload, increased speed, and/or reduced latency. GMSK also supports EDC techniques for greater reliability. The multitude of frequencies used in GMSK, even if the level of the trigger were boosted above −70 dbm, are less human perceptible and sound more like static or noise, and distract less from human perceptible content.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, serial connection, ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
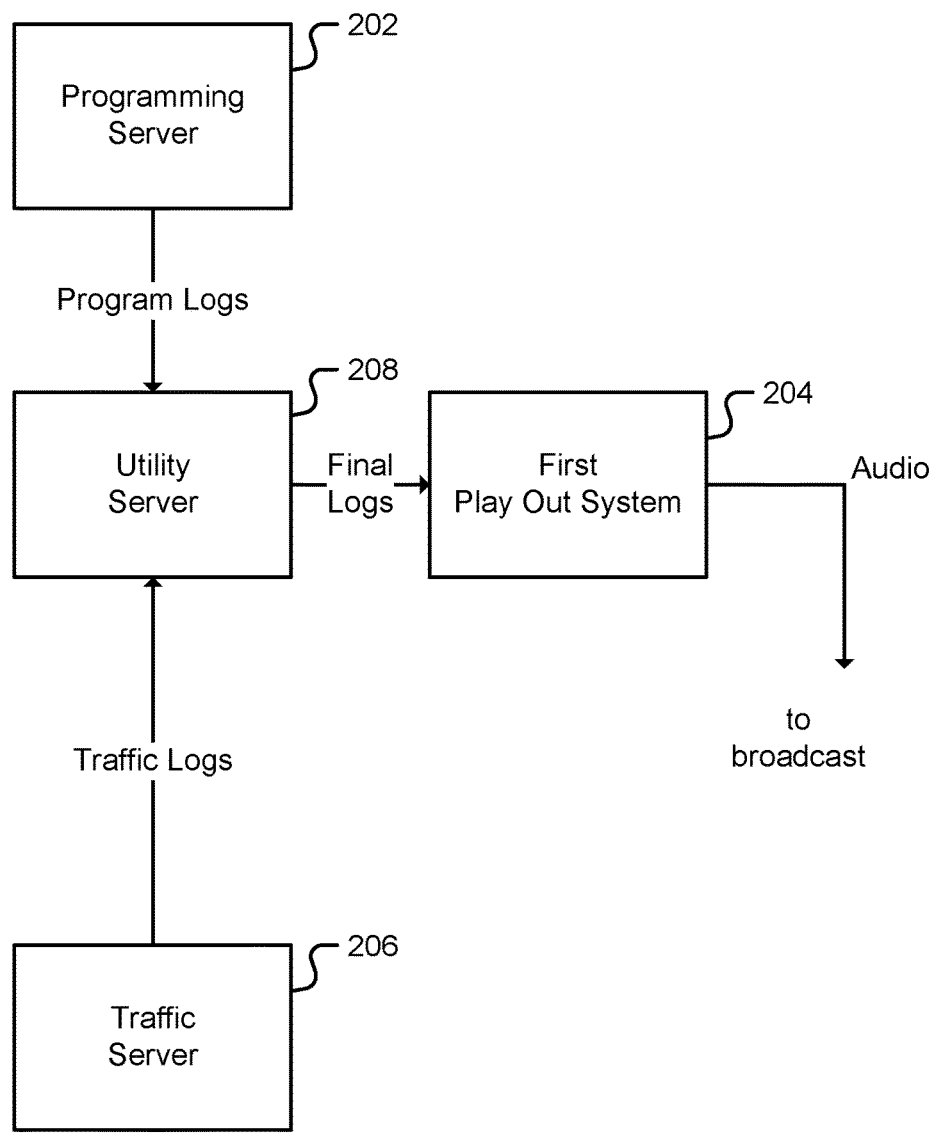
FIG. 2A is a block diagram illustrating a traditional broadcast system.

FIG. 2A is a block diagram illustrating a traditional broadcast system. In the example shown, 202 is a programming server. Throughout this specification, "programming" refers to core content of the broadcast station, usually content that is more valuable for broadcast consumers, for example listeners or viewers of the broadcast. Throughout this specification, "server" refers without loss of generality to either an internal or external system/platform and may be implemented in software and/or hardware. Thus, a utility server 208 and first play out system 204 may be housed within a single computer as shown in FIG. 1.

A programming server typically has access to pre-recorded or live programming content to be interleaved with traffic and/or ad content. Programming server 202 is coupled with a utility server 208 via program logs, which are generally human readable files, for example text files, that indicate log book and/or timing details for "carts", which are cartridges and/or unique identifiers for specific creative pieces, including programming, commercials, weather, news, top-of-the-hour, and other programming. For example cart COM-2537 may be a 30-second advertisement for a national home-improvement store with a 10% promotion. Program logs contain information on carts like PRO-1024 which may be a Top 40 popular song that happens to take three minutes and fifty-one seconds. The program logs may also store information for disc jockeys (DJs) such as artist, title, track, rotation, and trivia information about the cart.

Similarly, traffic server 206 provides traffic content. Throughout this specification "traffic" content refers to content other than programming, for example traffic reports, weather reports, local news, FCC mandated spots, such as top-of-the-hour, and local/network/national ad spots. Traffic server 206 is coupled to utility server 208 via traffic logs. Traffic logs contain information on carts like the example of COM-2537 above, or WEA-1100 which may have the eleven o'clock weather report for forty-five seconds.

Utility server 208 provides a merge and/or continuity function to form final logs that are the program logs from programming server 202 and traffic logs from traffic server 206 merged for final play out. The final logs are submitted to first play out system 204, also known as a primary play out system, or an automation system. Without loss of generality, the automation system may include both utility server 208 and play out system 204. The play out system has an audio codec and the capability to directly push content to broadcast.

Typically logs, based on schedulers' log books, are generated a day prior to a broadcast airing and have a predetermined schedule of triggering traffic via the play out systems 204 and 208. This is an issue in that logs are static by being generated so early, and that audio copy cannot be changed in real time.

Figure 2B:
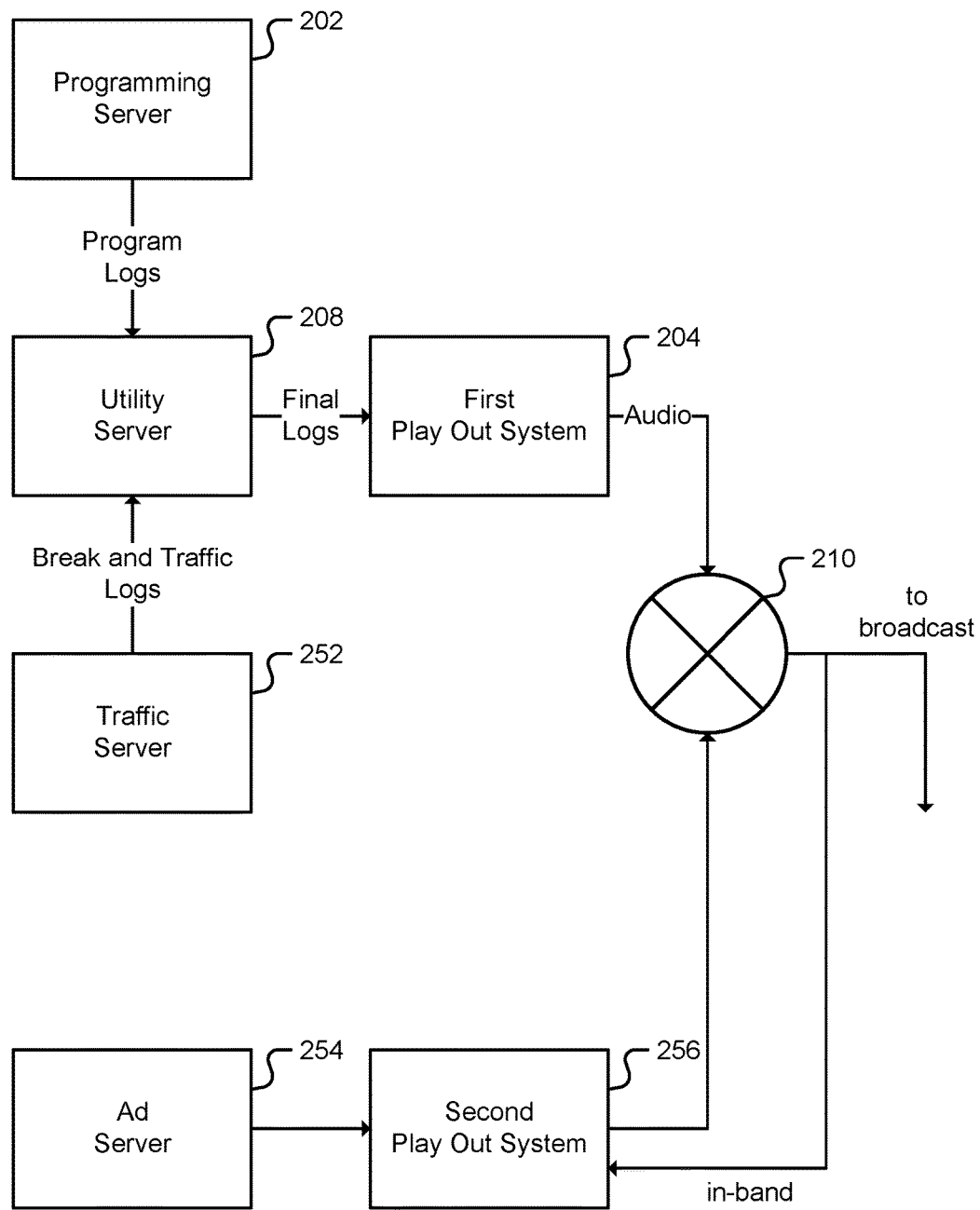
FIG. 2B is a block diagram illustrating an example of an in-band triggering broadcast system triggering a real time ad server to play spots in real time.

FIG. 2B is a block diagram illustrating an example of an in-band triggering broadcast system triggering a real time ad server to play spots in real time. In the example shown, similar to FIG. 2A, programming server 202 is coupled with first play out system 204 via utility server 208 which is coupled with mixer 210. One traffic server 252 providing, for example, commercial breaks, traffic, and weather reports, is also coupled with play out system 204 via utility server 208 to provide some but not all of the traffic content for broadcast, and it leaves room for another traffic server using "break" logs. Another traffic server, also known as an ad server 254, is coupled with another second play out system 256. In one embodiment, the ad server 254 is a cloud based platform, wherein cloud refers to cloud computing. Although traffic server 254 is depicted as an ad server, without loss of generality the same in-band trigger techniques may be used for non-advertising content. Because second play out system 256 has its own audio codec, and ad server 254 may be cloud computing based including associated with the internet, it provides a way for media creative to be loaded and scheduled in real time to be merged with the day-old programming logs of a traditional broadcast.

Furthermore, because second play out system 256 can listen to in-band program audio, it can provide real time compliance data to a cloud platform, for example ad server 254. This allows a traffic agent, for example an advertiser or ad agency, to verify a creative spot was played in full, what time it was played, when it was played in the logs (for example what program was played prior to the creative spot being played), and the frequency it was played.

Second play out system 256 does not have an auxiliary network for triggering but rather directly monitors the output of mixer 210 in-band. When second play out system 256 detects and decodes an in-band trigger, it directly plays content based on instructions and audio copy from ad scheduling server 254 to mixer 210 and out to broadcast.

Figure 3A:
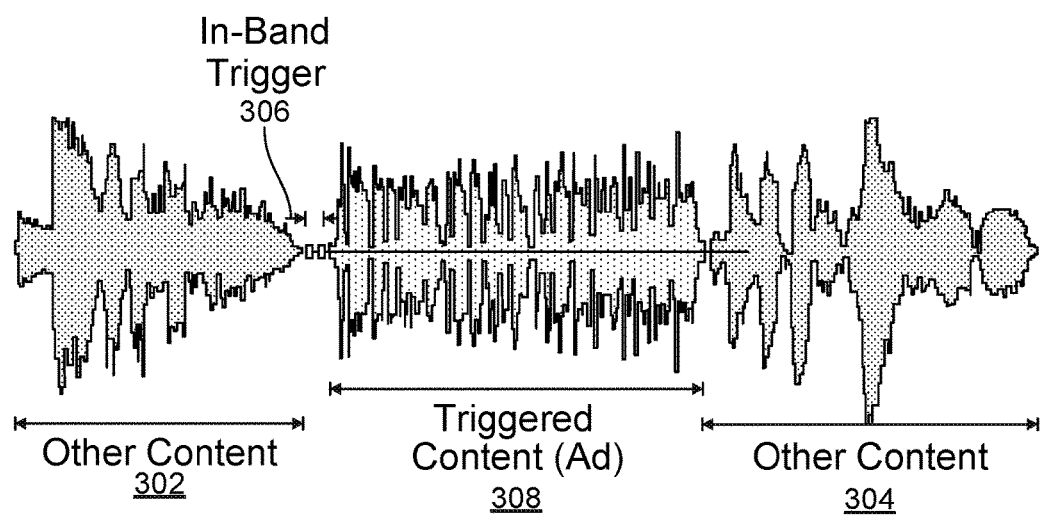
FIG. 3A is an illustration of a broadcast stream as a waveform, shown as a function of amplitude over time.

FIG. 3A is an illustration of a broadcast stream as a waveform, shown as a function of amplitude over time. In one embodiment the output of mixer 210 in FIG. 2B is shown as the waveform in FIG. 3A. Between other content 302 and 304, the automation server 204 determines that a slot is available for ad content. Automation server 204 then outputs in-band trigger 306 to mixer 210 and out to broadcast, and shortly after the second play out server 256 plays triggered content 308.

In one embodiment, the in-band trigger 306 is a prerecorded "cart" or multimedia file that is generated beforehand as a dedicated placeholder to signal 256 the Second Play Out System. For example, if a radio station signs on a new ad service or ad network, as part of the initiation an order is placed in the traffic server (252) to schedule the ad service or ad network breaks within main program audio. Prerecorded signaling carts are generated that identify the new ad service or network and includes the encoded cart duration, for example 30 seconds, 60 seconds, etc.

Figure 3B:
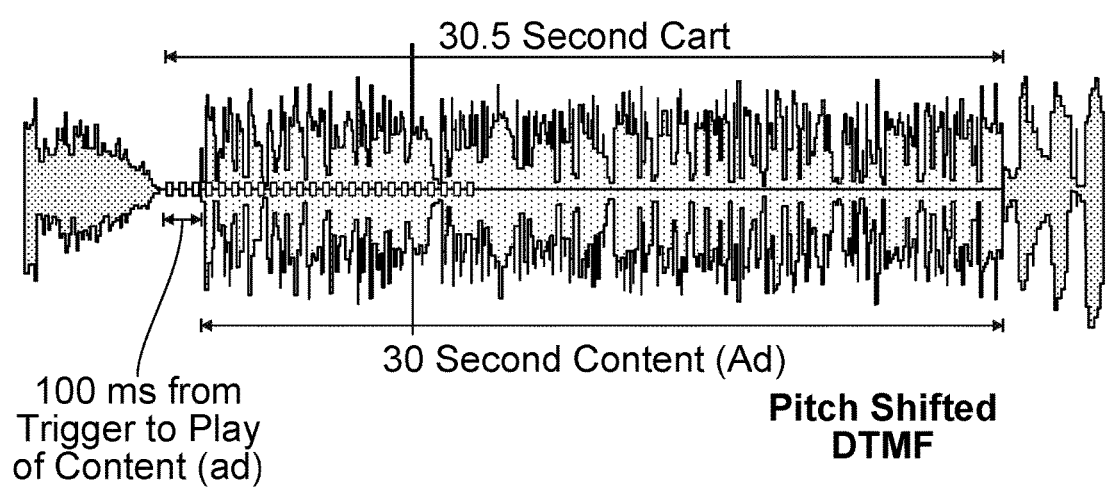
FIG. 3B is a closer illustration of a broadcast stream as a waveform for pitch shifted DTMF.

FIG. 3B is a closer illustration of a broadcast stream as a waveform for pitch shifted DTMF. In one embodiment the waveform of FIG. 3B is a magnified illustration of FIG. 3A to show sample timing of an in-band triggering system. In FIG. 3B it is shown that a typical time for in-band trigger gap using the pitch shifted DTMF is around 100 ms for when there can be no other content covering the trigger. As an automation server 204 may reserve 30.5 seconds for a cart, and the content itself is 30 seconds, this gives sufficient margin without a high amount of gap content.

Figure 3C:
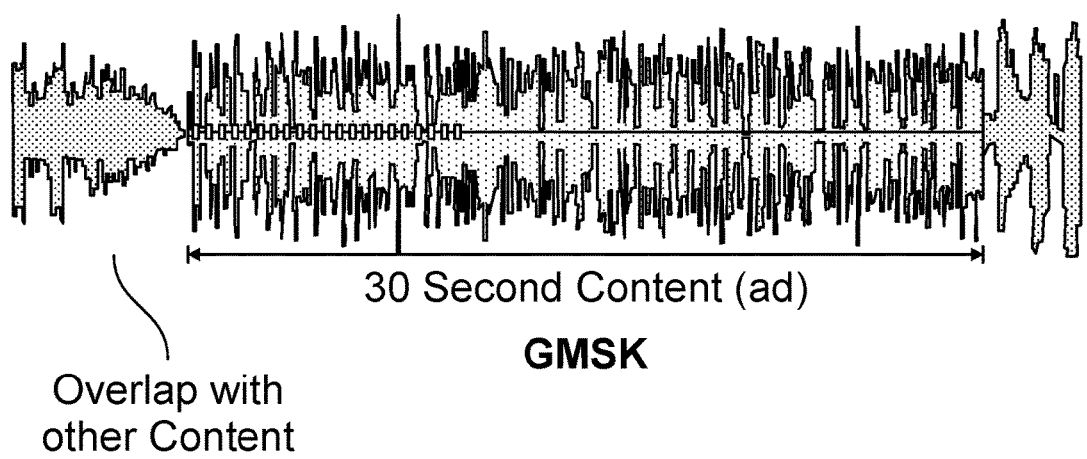
FIG. 3C is a closer illustration of a broadcast stream as a waveform for GMSK.

FIG. 3C is a closer illustration of a broadcast stream as a waveform for GMSK. By contrast with FIG. 3B, for GMSK, there is no gap latency since the signal may be detected even when covered/overplayed by other content.

Figure 4A:
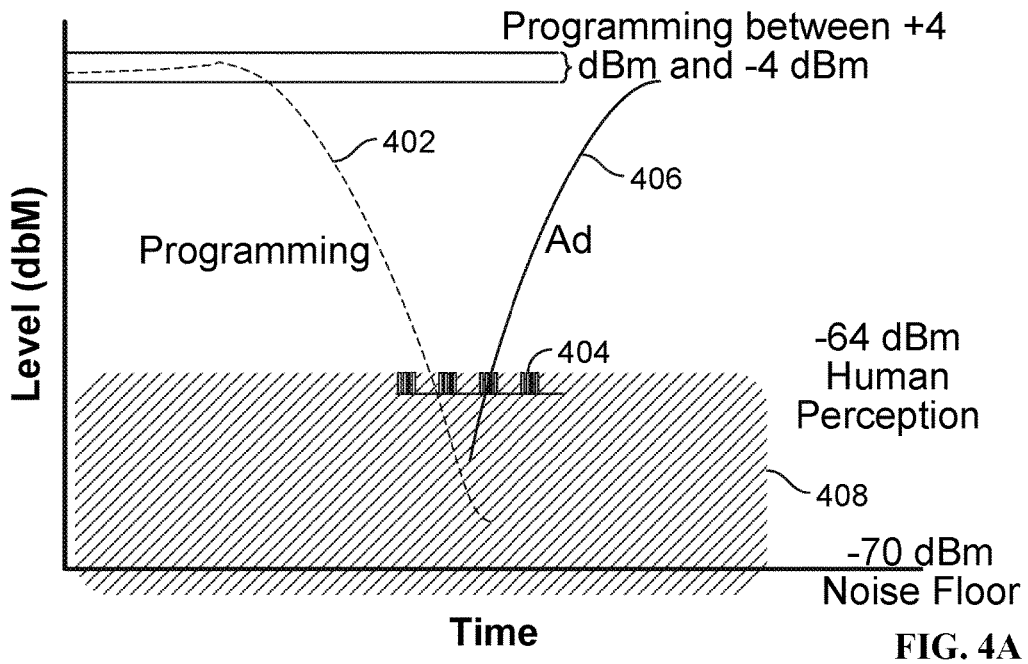
FIG. 4A is a block diagram illustrating human perceptibility as it relates to in-band triggering of level versus time within a broadcast studio prior to the broadcast audio chain.

FIG. 4A is a block diagram illustrating human perceptibility as it relates to in-band triggering of level versus time within a broadcast studio prior to the broadcast audio chain. In one embodiment the waveforms shown in FIG. 4A are related to the waveform output from mixer 210 in FIG. 2B.

Programming content 402, shown as a dotted line, is broadcast at a prespecified level that can be clearly consumed in broadcast, and is shown in this example to be between +4 dBm and −4 dBm. At some point automation system 204 triggers ad content from ad server 254 and secondary play out system 256 using the trigger card 404. As can be shown in the example, the trigger card 404 is played at −64 dBm, which is much less human perceptible than programming content. This triggers the ad content 406, shown as a solid line. Although the example shown is a pitch shifted DTMF example, a GMSK example would show even tighter gaps between programming 402 and ad 406, since GMSK signals may be detected even when covered by other content.

Producing the encoded trigger at −64 dBm or below reduces the chance that a broadcast consumer may hear the trigger itself, and is shown as a shaded area 408 in FIG. 4A. Furthermore, it is common that broadcast stations may filter any signal coming from mixer 210 below −50 dBm as it broadcasts it to reduce noise on a broadcast. Some modulation techniques may take into account the noise floor of the in-band stream between −70 dBm and −90 dBm. For example, pitch shifted DTMF may be susceptible to corruption below −70 dBm. Other modulation techniques are more resilient, for example GMSK may be detectable and decodable below −90 dBm, or at much higher signal levels at higher frequency ranges, for example with single carrier frequency vs multiple frequencies for DTMF.

Figure 4B:
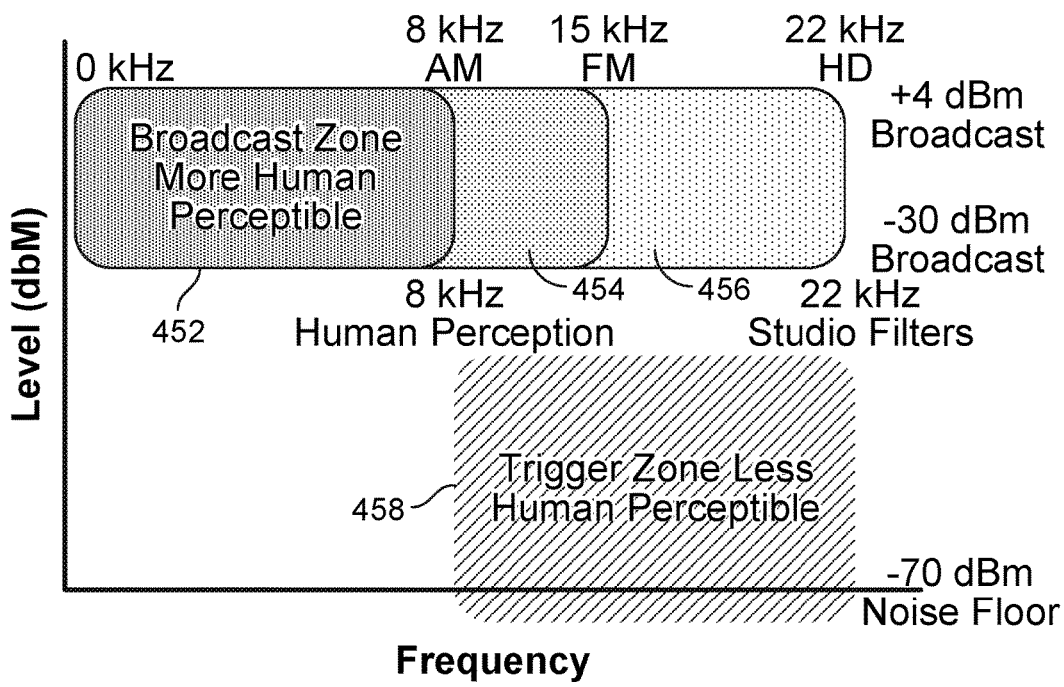
FIG. 4B is a block diagram illustrating human perceptibility as it relates to in-band triggering of level versus frequency.

FIG. 4B is a block diagram illustrating human perceptibility as it relates to in-band triggering of level versus frequency. In one embodiment the waveforms shown in FIG. 4B are related to the waveform output from mixer 210 in FIG. 2B.

Human perceptibility is statistical, although generally humans can hear between 0 and 8 kHz (and a significant portion up to 15 kHz), and as shown in FIG. 4A, above −64 dBm level. Thus, some modulation techniques to reduce human perceptibility may assert signal in the range above 8 kHz.

For example, a broadcast zone that would be broadcast from mixer 210 for AM radio 452 that is more human perceptible may be between 0 and 8 kHz, and from +4 dBm to −30 dBm level. Similarly the broadcast zone for FM radio 454 may be between 0 and 15 kHz, and from +4 dBm to −50 dBm level, and the broadcast zone for HD radio 456 may be between 0 and 22 kHz, and from +4 dBm to −70 dBm level. Generally most broadcast facilities and studios support full audio frequencies up to 22 kHz given that compact disc ("CD") audio has the same spectral content. The actual broadcast chain and processors may limit the frequencies and levels based on the transmission modulation requirements.

Therefore, design of modulation for in-band triggers focusses signal content within a trigger zone 458 for pitch shifted DTMF, that is less human perceptible at −64 dBm in level. Similarly, for GMSK, the level may even be at broadcast levels (+4 dBm to −4 dBm), however the frequency range is above human perception.

Figure 5:
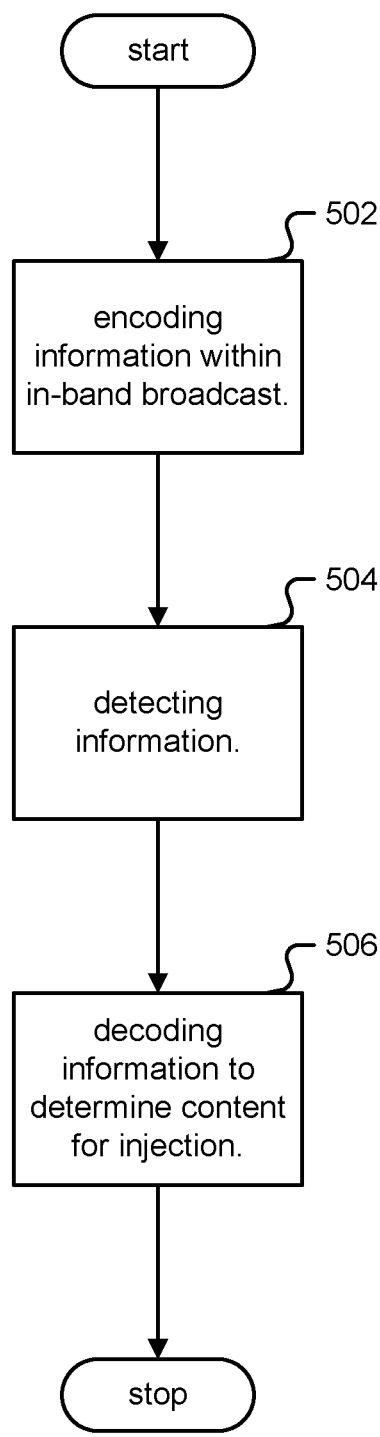
FIG. 5 is a block diagram illustrating a method of in-band signaling.

FIG. 5 is a block diagram illustrating a method of in-band signaling. In step 502, information is encoded for an in-band broadcast. The step of encoding information associated with a broadcast stream event within an in-band broadcast may include:
- modulating the encoding at least in part to reduce human perceptibility of the encoded information by a consumer of the broadcast stream;
- modulating includes upshifting frequency, for example to center frequencies higher than 1633 Hz and/or of DTMF encoded characters;
- modulating includes reducing amplitude, for example below −64 dBm;
- modulating includes downshifting frequency, for example downshifting GMSK to between 8 kHz and 22 kHz;
- modulating includes using any sophisticated technique that is more complex than simply using one or two tones, like the traditional simple tone or non-shifted DTMF;
- modulating includes using error detection and/or correction techniques.

The broadcast stream event includes both a service identifiable by traffic server 254 and a duration of the cart, which can then enable traffic server 254 and/or second play out system 256 to select content after the trigger. In one embodiment the encoding step may be done off-line and on another server not shown in FIG. 2B.

In step 504, information is detected. The step of detecting the encoded information in a broadcast stream in some embodiments is depicted in FIG. 2B as in-band detection by the second play out system 256 detecting the encoded information from first play out system 204.

In step 506, information detected is decoded to determine content for injection. The step of decoding the detected information at least in part to determine content to be injected into the broadcast stream in some embodiments is depicted in FIG. 2B as decoded by the second play out system 256 in order to determine ad content to be injected into the broadcast stream via mixer 210. In various embodiments, the second play out system 256 uses a software radio to detect (via step 504) and/or decode (via step 506) such that changes in the modulation do not require a change out of hardware in second play out system 256, but for example, simply an update of firmware and/or system files.

Figure 6:
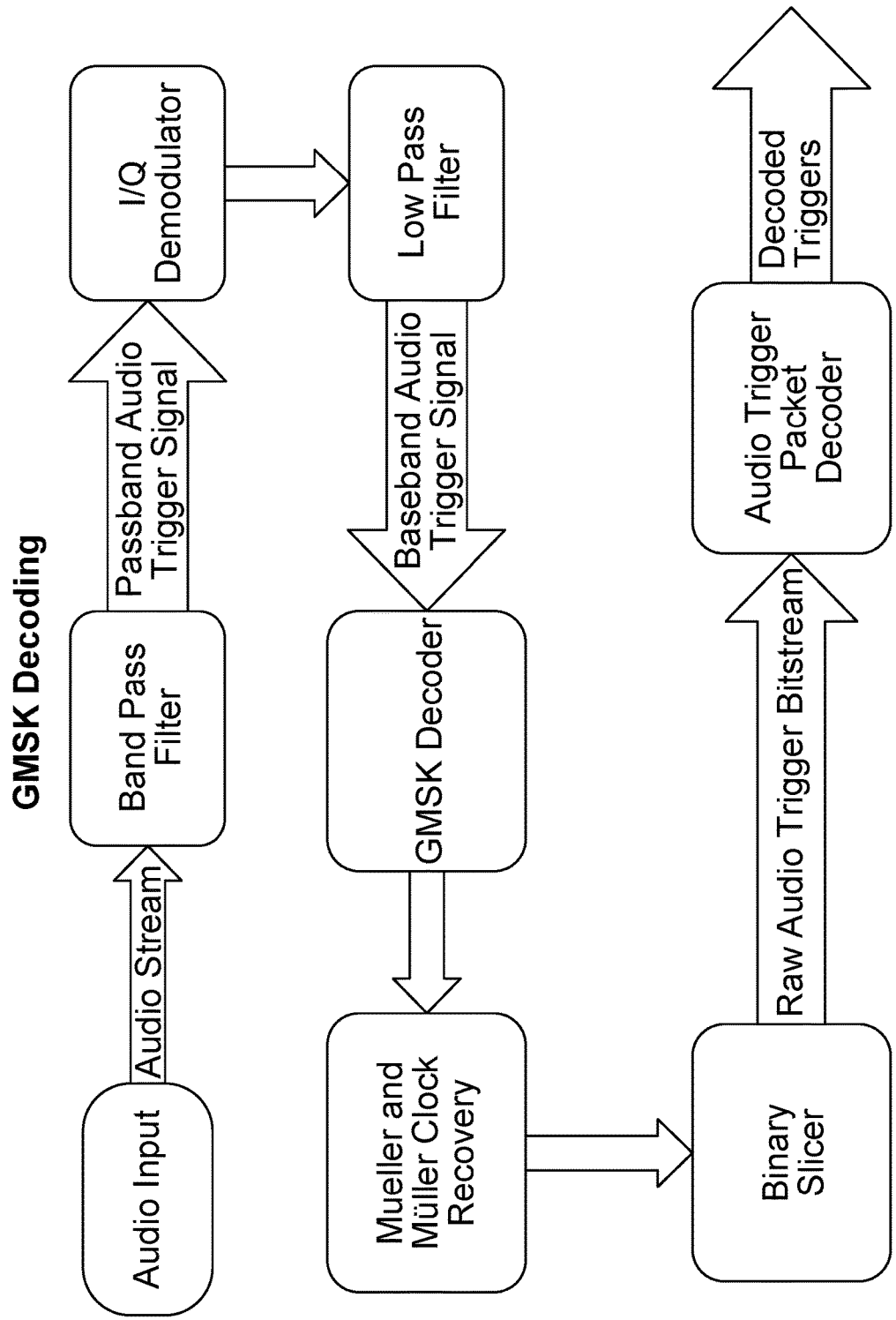
FIG. 6 is a block diagram illustrating a sample implementation of modulation decoding for GMSK.

FIG. 6 is a block diagram illustrating a sample implementation of modulation decoding for GMSK. In one embodiment the detection step 504 and decoding step 506 of FIG. 5 by second play out system 256 is detailed in FIG. 6.

Audio input from the output of primary play out system 204 is input to system 256, and the audio stream goes through a band pass filter to provide passband audio trigger signal to an I/Q demodulator. The I/Q demodulator demodulates and is passed through a low pass filter to provide a baseband audio trigger signal. The baseband audio trigger signal is input to a GMSK decoder and clock recovery is performed, shown here using a Mueller and Müller technique. The result is binary sliced and the raw audio trigger bitstream is then processed by an audio trigger packet to output decoded triggers.

SUMMARY

Using an architecture of on-premise installed, playback server and cloud platform architecture, working alongside traditional traffic and automation systems, a server may play spots to fill an ad break scheduled into local automation system. Thus, a server requires a trigger to initiate ad plays.

A trigger is an event message to initiate the start of a program break on, for example a broadcast channel. The program break may signal the start of ad, ad block, or programming, and so on. A trigger may come in the form of a TCP/IP message, audio tone, or even physical closure, but a disadvantage is that there is no standard across automation systems for such messages. It would be advantageous to have a trigger system that works across a wide variety playback systems, supports higher data rates and/or has a faster response rate, is not necessarily noticeable to users of the broadcast, and works reliably in the audio band.

Traditionally, triggers come in the form of physical closures (physical relay closures), TCP/IP messages (e.g. TCP/IP, UDP, XML, etc), or audio tones that play within programming, or out-of-band with programming. The disadvantage to TCP/IP messages is that there is no standard across all automation systems, so deep integration is required with every system. Physical closures may work in some cases, but also have limitations as the number of unique closures supported, there also is no standard, and additional equipment and configuration is required. Audio tones have the ability to work across all automation systems without requiring additional equipment, configuration, and so on; however traditional audio tones also have some disadvantages—including, but not limited to, requirements to play at a level and frequency that is audible by listeners, requiring the tone to play during a silent passage, leaving a gap in programming, or requiring a certain amount of time (e.g. 1 second) to detect the tone—which is also not desirable in programming.

Triggering a server to play spots using encoded data that is not perceptible, or sub-perceptible (that is, less perceptible) in either frequency or level, and does not require a silent passage is disclosed. This process reduces the need for any gap in programming. The process can also be played across an extremely wide range of levels, and even detected across "muted" channel sources.

This may also be a solution to other problems. For example, broadcast satellite receivers use a variety of methods to trigger spots to play in programming, or even for the start of programming. This process may be used in any case where a local automation system, or live person (for example, a DJ, board operator, or on-air talent) needs to manually trigger a system to play. A variety of other advantages are available with this process, including the ability to ID and detect spots, and detect station errors, or system failures, during ad playback. The technology may also be used to code, or mark, programming, audio liners, etc., beyond advertisements.

In one embodiment, a server works with all automation systems and does not require deep software integration to all systems used in broadcasting. This process improves such servers. Many stations in the U.S. and elsewhere in the world are using software and systems that are antiquated and do not have any active development available, so such servers require a new process to interface with such stations, using a technique that is standard for broadcast, audio connections. This is an advantage over traditional techniques wherein some stations use standard audio tones that are not necessarily encoded, or DTMF tones to trigger, but usually they have between 1-3 tones or closures. Another limitation of traditional techniques is the amount of time to detect these simple tones. The process disclosed now scales to essentially an unlimited number of triggers, wherein each trigger maps to a length of the break/avail, network, station ID, and so forth.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   encoding information associated with a broadcast stream event within an in-band broadcast;
   detecting the encoded information in a broadcast stream; and
   decoding the detected information at least in part to determine content to be injected into the broadcast stream, wherein:
   the broadcast stream is a linear radio broadcast for at least one of the following: AM radio, FM radio, and HD radio; and
   the in-band broadcast originates at least in part from a play-out system for a linear radio broadcast station.

2. The method of claim 1, wherein the encoding is modulated at least in part to reduce human perceptibility of the encoded information by a consumer of the broadcast stream.

3. The method of claim 2, wherein the modulation comprises upshifting frequency.

4. The method of claim 2, wherein the modulation comprises upshifting frequency to center frequencies higher than 1633 Hz.

5. The method of claim 2, wherein the modulation comprises upshifting frequency of DTMF encoded characters.

6. The method of claim 2, wherein the modulation comprises reducing amplitude.

7. The method of claim 2, wherein the modulation comprises reducing amplitude to levels far below normal broadcast levels.

8. The method of claim 2, wherein the modulation comprises downshifting frequency.

9. The method of claim 2, wherein the modulation comprises downshifting frequency of GMSK modulated data.

10. The method of claim 2, wherein the modulation comprises use of multi-frequency signaling using a mixture of three or more tones.

11. The method of claim 2, wherein the modulation is a digital modulation, comprising one or more of the following: ASK, APSK, CPM, FSK, MFSK, MSK, OOK, PPM, PSK, QAM, I/Q modulation, SC-FDE, and TCM.

12. The method of claim 2, wherein the modulation is an analog modulation, comprising one or more of the following: AM, FM, PM, QAM, SM, and SSB.

13. The method of claim 2, wherein the modulation is a spread spectrum, comprising one or more of the following: CSS, DSSS, FHSS, and THSS.

14. The method of claim 2, wherein the modulation includes error detection techniques.

15. The method of claim 2, wherein the modulation includes error correction techniques.

16. The method of claim 2, wherein the broadcast stream event comprises a service and a duration.

17. The method of claim 1, wherein the modulated encoding is stored as a recording.

18. The method of claim 1, further comprising receiving an indication to trigger the broadcast stream event from a play out system.

19. The method of claim 1, wherein the broadcast comprises one or more of the following: a radio broadcast, a television broadcast, movie broadcast, sports broadcast, satellite broadcast, and cable broadcast.

20. The method of claim 1, further comprising inserting real time ads.

21. The method of claim 20, wherein the real time ads are inserted from a cloud platform.

22. The method of claim 21, further comprising providing real time compliance data.

23. A system, comprising:
   an encoder configured to encode information associated with a broadcast stream event within an in-band broadcast; and
   a receiver coupled to a broadcast stream, wherein the receiver is configured to:
   detect the encoded information in the broadcast stream; and
   decode the detected information at least in part to map the decoded information to content to be injected into the broadcast stream, wherein:
   the broadcast stream is a linear radio broadcast for at least one of the following: AM radio, FM radio, and HD radio; and
   the in-band broadcast originates at least in part from a play-out system for a linear radio broadcast station.

24. A computer program product, the computer program product being embodied in a non-transitory computer readable storage medium and comprising computer instructions for:
   encoding information associated with a broadcast stream event within an in-band broadcast;
   detecting the encoded information in a broadcast stream; and
   decoding the detected information at least in part to map the decoded information to content to be injected into the broadcast stream, wherein:
   the broadcast stream is a linear radio broadcast for at least one of the following: AM radio, FM radio, and HD radio; and
   the in-band broadcast originates at least in part from a play-out system for a linear radio broadcast station.

* * * * *